No. 827,843. PATENTED AUG. 7, 1906.
T. BEDNAROWICZ.
SELF LUBRICATING TROLLEY WHEEL.
APPLICATION FILED MAR. 8, 1906.
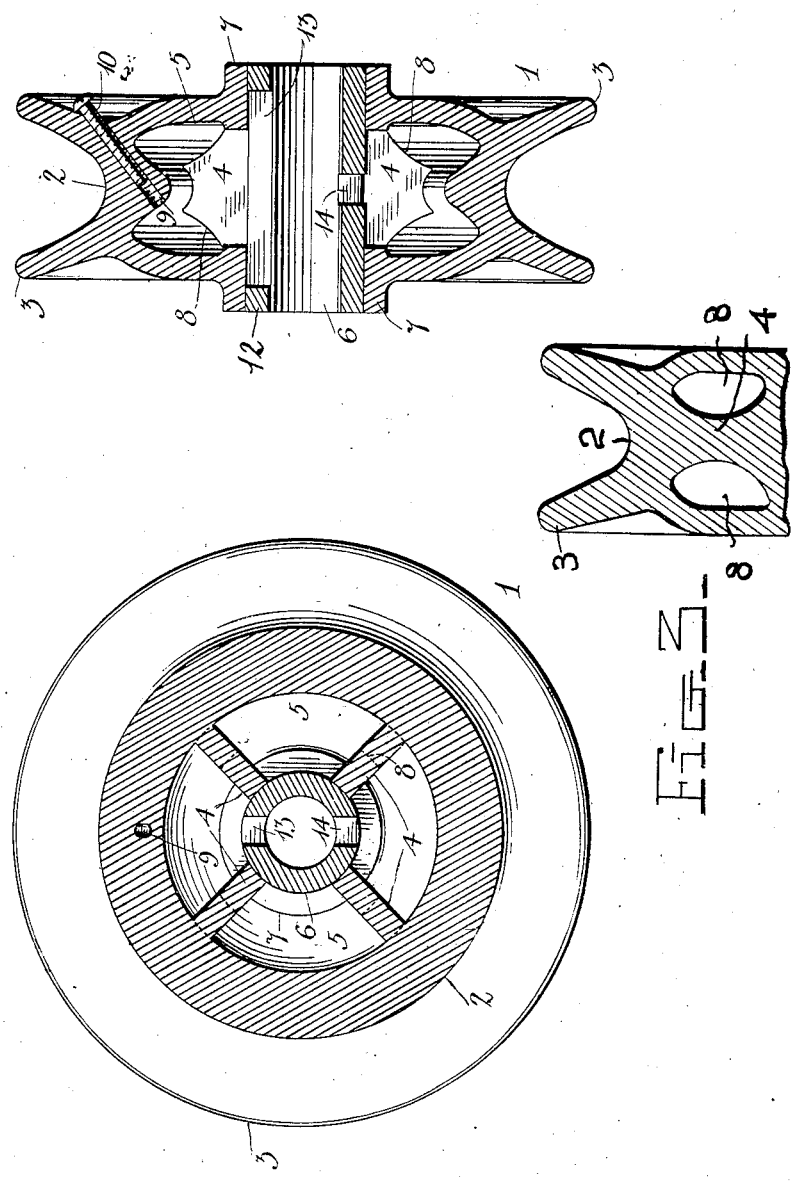
Witnesses
Inventor
Theopihl Bednarowicz,
by H. B. Willson & Co
Attorneys
THE NORRIS PETERS CO., WASHINGTON, D. C.

UNITED STATES PATENT OFFICE.

THEOPIHL BEDNAROWICZ, OF SOUTH BEND, INDIANA.

SELF-LUBRICATING TROLLEY-WHEEL.

No. 827,843.     Specification of Letters Patent.     Patented Aug. 7, 1906.

Application filed March 8, 1906. Serial No. 304,935.

*To all whom it may concern:*

Be it known that I, THEOPIHL BEDNAROWICZ, a citizen of the United States, residing at South Bend, in the county of St. Joseph and State of Indiana, have invented certain new and useful Improvements in Self-Lubricating Trolley-Wheels; and I do declare the following to be a full, clear, and exact description of the invention, such as will enable others skilled in the art to which it appertains to make and use the same.

This invention relates to improvements in self-lubricating trolley-wheels.

The object of the invention is to provide a wheel of this character in which lubricating material may be stored, means being provided whereby said lubricating material will be properly fed to the axle or journal of the wheel, thus providing for the lubricating of the same.

With the above and other objects in view the invention consists of certain novel features of construction, combination, and arrangement of parts, as will be hereinafter described and claimed.

In the accompanying drawings, Figure 1 is a vertical sectional view of a trolley-wheel constructed in accordance with the invention. Fig. 2 is a similar view taken at right angles to Fig. 1, and Fig. 3 is a detail sectional view of the same.

Referring more particularly to the drawings, 1 denotes the wheel, which may be of the ordinary or any desired construction provided on its outer edge or periphery with wire-engaging grooves 2 and outwardly-flaring flanges 3. The body of the wheel is preferably formed hollow and is provided with a series of radially-disposed partitions 4, of which there may be any desired number, the wheel being here shown as provided with four partitions arranged diametrically opposite to each other, thus dividing the hollow body of the wheel into four chambers or pockets 5, which communicate with the bushing 6 through openings formed in the hub 7 of the wheel.

In the partitions 4 are formed passages 8, whereby communication will be afforded between the compartments or pockets 5 to facilitate the circulation of the lubricating material therethrough. The passages 8 may be arranged in any suitable position in the partitions, but are preferably formed in the upper corners of the same, as shown.

Formed in one side of the rim of the wheel is a filling opening or passage 9, which communicates with one of the compartments or pockets 5 and is normally closed by a screw-plug 10. Arranged in the hub 7 of the wheel is a bushing 12, said bushing being provided in one side with a longitudinally-disposed slot 13 and in its opposite side with a centrally-disposed hole 14. The slot 13 is for the purpose of admitting the lubricant from the compartments or pockets 5 to the journal of the wheel in the proper quantities to lubricate the same. The hole 14 is for the purpose of providing a vent to permit the escape of air from between the journal and the bushing, thus facilitating the entrance of the oil or other lubricating material through the slot 13 to the journal.

From the foregoing description, taken in connection with the accompanying drawings, the construction and operation of the invention will be readily understood without requiring a more extended explanation.

Having thus described my invention, what I claim as new, and desire to secure by Letters Patent, is—

The herein-described self-lubricating trolley-wheel consisting of a hollow body portion, radially-disposed partitions arranged therein to form pockets for holding lubricating material, said partitions having communicating openings at their outer corners, a hub formed on said wheel, a bushing disposed within said hub, said bushing having in one of its sides a longitudinally-disposed feed-slot and in its opposite side a vent-opening, a filling-opening formed in one side of said wheel and communicating with one of said pockets, and a plug to close said opening, substantially as described.

In testimony whereof I have hereunto set my hand in presence of two subscribing witnesses.

THEOPIHL BEDNAROWICZ.

Witnesses:
   LOUIS A. HULL,
   CHESTER GRZESK.